US006194988B1

(12) United States Patent
Yamaguchi et al.

(10) Patent No.: US 6,194,988 B1
(45) Date of Patent: Feb. 27, 2001

(54) LOW MELTING POINT ELEMENT FUSION APPARATUS AND CIRCUIT BREAKER INCLUDING THE SAME

(75) Inventors: Noboru Yamaguchi, Shizuoka-ken; Tomonori Takamizawa; Tsugio Noda, both of Saitama-ken, all of (JP)

(73) Assignees: Yazaki Corporation, Tokyo; Nichiyu Giken Kogyo Co., Ltd., Kawagoe, both of (JP)

( * ) Notice: Subject to any disclaimer, the term of this patent is extended or adjusted under 35 U.S.C. 154(b) by 0 days.

(21) Appl. No.: 09/342,596

(22) Filed: Jun. 29, 1999

(30) Foreign Application Priority Data

Jun. 30, 1998 (JP) ................................................ 10-184756

(51) Int. Cl.$^{7}$ .......................... H01H 71/20; H01H 37/76; B60L 1/00; B60K 28/10

(52) U.S. Cl. .......................... 337/157; 337/401; 337/405; 337/407; 337/408; 307/10.1; 180/279; 200/61.08

(58) Field of Search .................................... 337/157, 158, 337/401, 404, 405, 406, 408, 409, 407; 307/9.1–10.8, 119; 180/271, 274, 279, 281–283; 200/61.08; 361/115; 280/227

(56) References Cited

U.S. PATENT DOCUMENTS

| | | | | |
|---|---|---|---|---|
| 3,660,794 | * | 5/1972 | Brizzolara | 337/401 |
| 3,873,786 | * | 3/1975 | Lagofun | 200/61.08 |
| 3,915,236 | * | 10/1975 | Stichling | 169/61 |
| 3,932,717 | * | 1/1976 | Dike et al. | 200/61.08 |
| 3,958,206 | * | 5/1976 | Klint | 337/406 |
| 4,224,487 | * | 9/1980 | Simonsen | 200/61.08 |
| 4,417,519 | * | 11/1983 | Lutz | 102/263 |
| 4,638,283 | * | 1/1987 | Frind et al. | 337/162 |
| 5,360,999 | * | 11/1994 | Upshaw et al. | 307/112 |
| 5,535,842 | * | 7/1996 | Richter et al. | 180/279 |
| 5,877,563 | * | 3/1999 | Krappel et al. | 307/10.1 |

FOREIGN PATENT DOCUMENTS

| | | |
|---|---|---|
| 59-48505 | 11/1984 | (JP) . |
| 10-55742 | 2/1998 | (JP) . |

* cited by examiner

*Primary Examiner*—Leo P. Picard
*Assistant Examiner*—Anatoly Vortman
(74) *Attorney, Agent, or Firm*—Finnegan, Henderson, Farabow, Garrett & Dunner, L.L.P.

(57) ABSTRACT

A fusion apparatus is equipped with a fuse, a solid combustion agent, an igniting device, and a spring. The solid combustion agent and the igniting device are accommodated within an inner casing. The inner casing is disposed in the vicinity of, or in contact with, the fuse. The inner casing and the fuse are covered by an outer casing. The spring is disposed between the outer casing and the inner casing and urges the inner casing containing the solid combustion agent therein toward the fuse. When the igniting device receives a current supplied from the outside, the solid combustion agent is combusted by the ignition made by the igniting device and the resulting combustion heat softens the fuse. At this time, since the inner casing is pressing the fuse by means of the spring, the fuse is easily broken.

15 Claims, 5 Drawing Sheets

LOW MELTING POINT ELEMENT FUSION APPARATUS AND CIRCUIT BREAKER INCLUDING THE SAME

BACKGROUND OF THE INVENTION

The present invention relates to a fusion apparatus which in order to prevent the occurrence of a fire due to an abnormality such as that which occurs at the time of a collision accident of the vehicle, etc. cuts off by fusion a low melting point element such as a fuse installed in an electric circuit when an abnormality happens in a vehicle, and a circuit breaker including the same.

Generally, in an electric circuit for an automobile, a fuse or a fusible link is used in order to instantaneously break the circuit when an excess current or short-circuit current has occurred.

However, a fuse or fusible link is one that is intended to break the circuit after the occurrence of an excess current. Therefore, it is impossible to compulsively break the circuit with an arbitrary timing. Accordingly, in order to prevent a fire caused by a spark that occurs from part of the electric circuit from being taken on a fuel, etc. which has leaked due to a collision accident of the vehicle, or the like, it was necessary to compulsively break the electric circuit from the outside.

Also, most of the recent automobiles are arranged to have their inside operated with the use of a computer system and the electric circuit involved also is wired in a complicated way. Therefore, the probability that a spark occurs due to a breakage or short-circuits of the electric wire at the time of a collision of the vehicle is becoming high. For this reason, in order to prevent the occurrence of a fire, etc., it was necessary to break the circuit at a position near to the power source.

As a technique of compulsively breaking the electric circuit, there is a circuit breaker which breaks, utilizing the explosion force of explosives, a breakage portion installed at part of the conductor and thereby breaks the electric circuit (see Japanese Patent Application Laid-Open Publication No. H10-55742).

The circuit breaker includes a cylindrical portion having an opening portion, an explosive inside the cylindrical portion, a filament inside the cylindrical portion which causes a firing of the explosive by way of an external power source, a breakage portion which makes connection between the conductors in front of the opening portion, and a cover portion which resists broken pieces due to a breakage having taken place due to the explosion force of the explosive and which resists a rapid rise in pressure.

In this circuit breaker, by causing the flow of a current the quantity of which is larger than prescribed, the explosive is exploded, and, by the resulting explosion force, the breakage portion in front of the opening is compulsively broken. Accordingly, it is possible to arbitrarily select the timing at which to cause the flow of the current into the filament, through a control circuit, and therefore to break the electric circuit as the occasion demands.

On the other hand, as a technique related to the fusion of a fuse, there is known a fuse described in Japanese Patent Publication No. 59-48505. A perspective view of this fuse is made in FIG. 1 and a sectional view taken along a line II—II of the fuse illustrated in FIG. 1 is made in FIG. 2.

As illustrated in FIGS. 1 and 2, a capsule 104 in which a fuse conductor dissolving agent 105 is sealed, is disposed within a fuse vessel 101. Due to the generation of heat from a fuse conductor 103, the capsule 104 is heated. When this heated temperature has reached a prescribed temperature not higher than a fuse conductor fusion temperature, the capsule 104 is fused and destroyed.

As a result of this, at the time of a short-circuit accident, even if the current which flows into the fuse conductor 103 is smaller than a rated magnitude of fusion current, the fuse conductor 103 can be reliably cut off by fusion.

SUMMARY OF THE INVENTION

However, in the above-described circuit breaker, since the circuit breaker uses the explosion force of the explosive, it was necessary to use a strongly-built protection cover for protection thereof against broken pieces or rapid pressure rise at the time of the breakage. For this reason, the structure thereof was made up complicatedly.

The breakage portion needs specific materials which can be broken even by a small magnitude of explosion force and which can be cut off by fusion even at the time of an excess current. In addition, since it was necessary to apply specific processing to various connections of different kinds of materials of which the breakage portion, conductors, and connection terminals were made, the cost became considerably high.

Because of the necessity of cutting the fuse off by fusion even at the time of an excess current, at the position near to the power source (battery) and through which several tens of amperes usually flow, the breakage portion becomes necessarily large in size. In addition, the amount of explosive also increases with the result that the fuse fusion apparatus itself becomes large in size and strongly built. Therefore, the circuit breaker practically used was limited to one for use as a local circuit breaker.

In the above-described conventional fuse, it was difficult to incorporate the capsule 104 into the fuse vessel 101 and fix this capsule 104. Also, when the fuse conductor dissolving agent 105 had reacted, there was a problem that the fuse vessel would be damaged due to the resulting thermal energy.

In view of the above, an object of the present invention is to provide a fusion apparatus which can quickly and reliably cut off a low melting point element such as a fuse and which is inexpensive and simple in structure and a circuit breaker including the same.

To attain the above object, a fusion apparatus according to the present invention is equipped with a low melting point element, a solid combustion agent, an igniting device, and an urging member. The low melting point element is installed within an electric circuit of the vehicle. The solid combustion agent is disposed in the vicinity of the low melting point element. The igniting device ignites the solid combustion agent when an abnormality happens in a vehicle. The urging member urges the solid combustion agent toward the low melting point element.

The solid combustion agent may be contacted with the low melting point element.

The igniting device may be caused to fire by receiving the power supplied from the outside when an abnormality happens in a vehicle.

The fusion apparatus may be further equipped with an outer casing which covers the solid combustion agent and the igniting device.

The urging member may be disposed between the solid combustion agent and the outer casing.

The fusion apparatus may be further equipped with an inner casing slidably supported inside the outer casing. The solid combustion agent and the igniting device may be fixed to the inner casing, and the urging member may be disposed between the inner casing and the outer casing.

The urging member may be constructed using a spring.

According to the above-described construction, when an abnormality happens in a vehicle, the solid combustion agent is combusted by being ignited by the igniting device and the resulting combustion heat softens the low melting point element. Since at this time the solid combustion agent is urged toward the low melting point element by the urging member, the low melting point element is quickly and reliably cut off by fusion. Accordingly, a fusion apparatus which is simple in structure and inexpensive is provided.

The outer casing may have a quality of heat insulation and include a surface electrically insulated.

According to the above-described construction, even when the low melting point element after fusion is contacted with the outer casing, the both are maintained in a state of their being electrically insulated from each other.

The solid combustion agent may contain metal powder and metal oxide. The metal powder contains therein at least one kind of element selected from the group consisting of B, Si, FeSi, Zr, Ti, and Al, while the metal oxide contains therein at least one kind of element selected from the group consisting of CuO, $MnO_2$, $Pb_3O_4$, $PbO_2$, $Fe_3O_4$, and $Fe_2O_3$.

The solid combustion agent may further contain therein an additive. The additive includes at least one kind of element selected from the group consisting of alumina, bentonite, and talc.

The solid combustion agent having the above-described construction has a high level of ignitability, a high rate of combustion, and, when combusted, generates a lesser amount of flame and gases and has its configuration maintained as was before its combustion.

By constructing the low melting point element using a fuse containing therein at least one kind of element selected from the group consisting of Sn, Pb, Zn, Al and Cu and setting the melting point of the fuse to be at a value of from 200° to 300° inclusive, it is possible to cope with a large magnitude of current.

By constructing the low melting point element using a fuse provided by injection molding a mixture of metal and resin, the metal containing therein at least one kind of element selected from the group consisting of Fe, Sn, Pb, Zn, Al and Cu, and setting the melting point of the fuse to be at a value of from 200° to 300° inclusive, it is possible to cope with a large magnitude of current.

By making the resin into a conductive resin containing therein metal fiber, low melting point metal, flux, and synthetic resin, the moldability, solderability, and conductivity become particularly high in level.

The circuit breaker according to the present invention is constructed of the above-described fusion apparatus, conductive connection terminals, and connection members. The connection terminals are disposed, on both ends of the low melting point element. The connection members have the connection terminals electrically connected and fixed to the low melting point element.

According to the above-described construction, when an abnormality happens in a vehicle, the low melting point element is cut off by fusion and as a result the electrical connection between the connection terminals on both sides of the low melting point element is cut off with the result that the electric circuit of the vehicle is broken.

DESCRIPTION OF THE PREFERRED EMBODIMENTS

Figure 7:
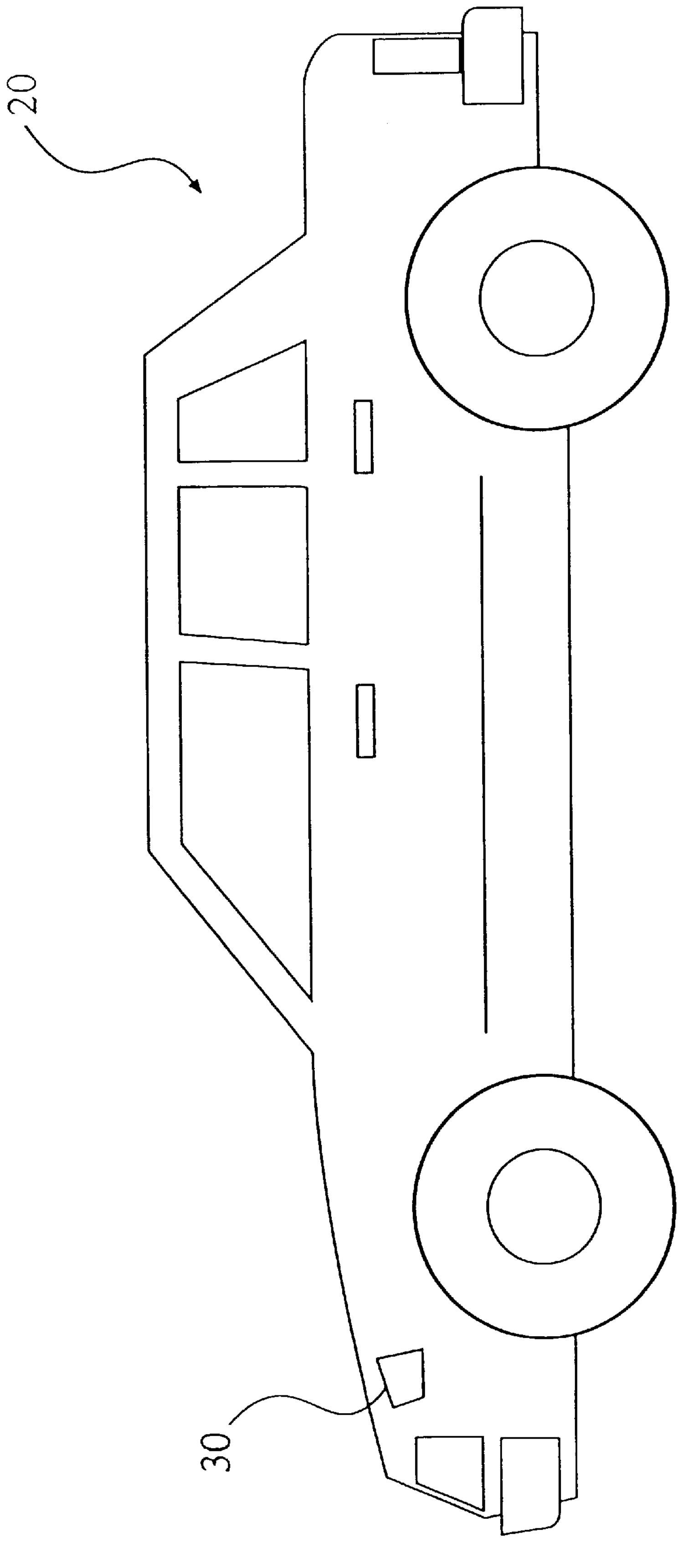
FIG. 7 is a side view illustrating a conventional vehicle including a circuit breaker including a fuse fusion apparatus of the present invention.

An embodiment of a low melting point element fusion apparatus, and a circuit breaker including the same, of the present invention will now be explained in detail with reference to the drawings. In this embodiment, an example wherein the low melting point element fusion apparatus is applied to a fuse fusion apparatus will be explained. Namely, a fuse is used as the low melting point element. FIG. 7 illustrates a conventional vehicle 20 that includes a circuit breaker including a fuse fusion apparatus 30 of the present invention.

Figure 1:
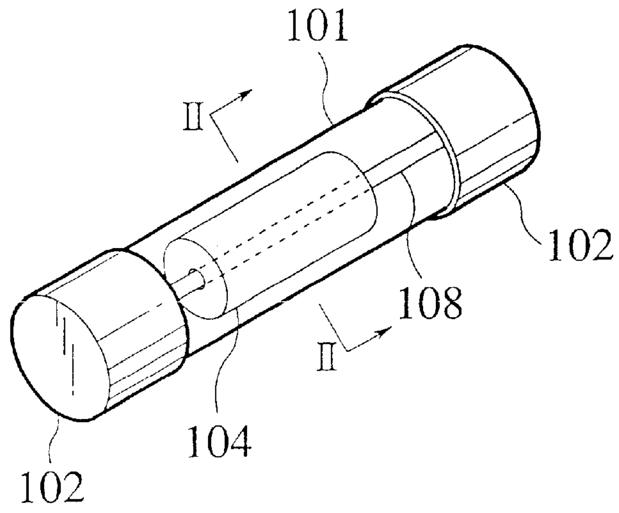
FIG. 1 PRIOR ART
FIG. 1 is a perspective view illustrating an embodiment of a conventional fuse.
Figure 2:
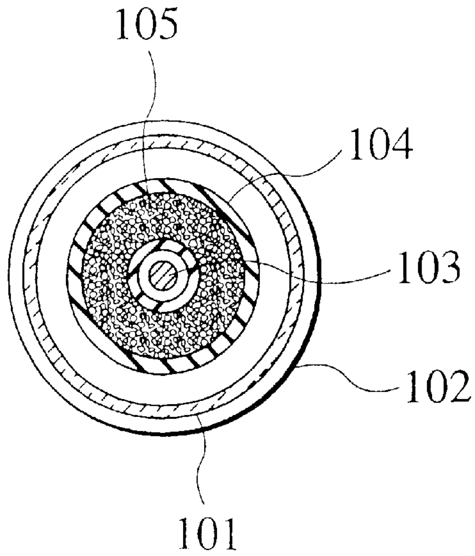
FIG. 2 PRIOR ART
FIG. 2 is a sectional view taken along a line II—II of the fuse illustrated in FIG. 1.
Figure 3:
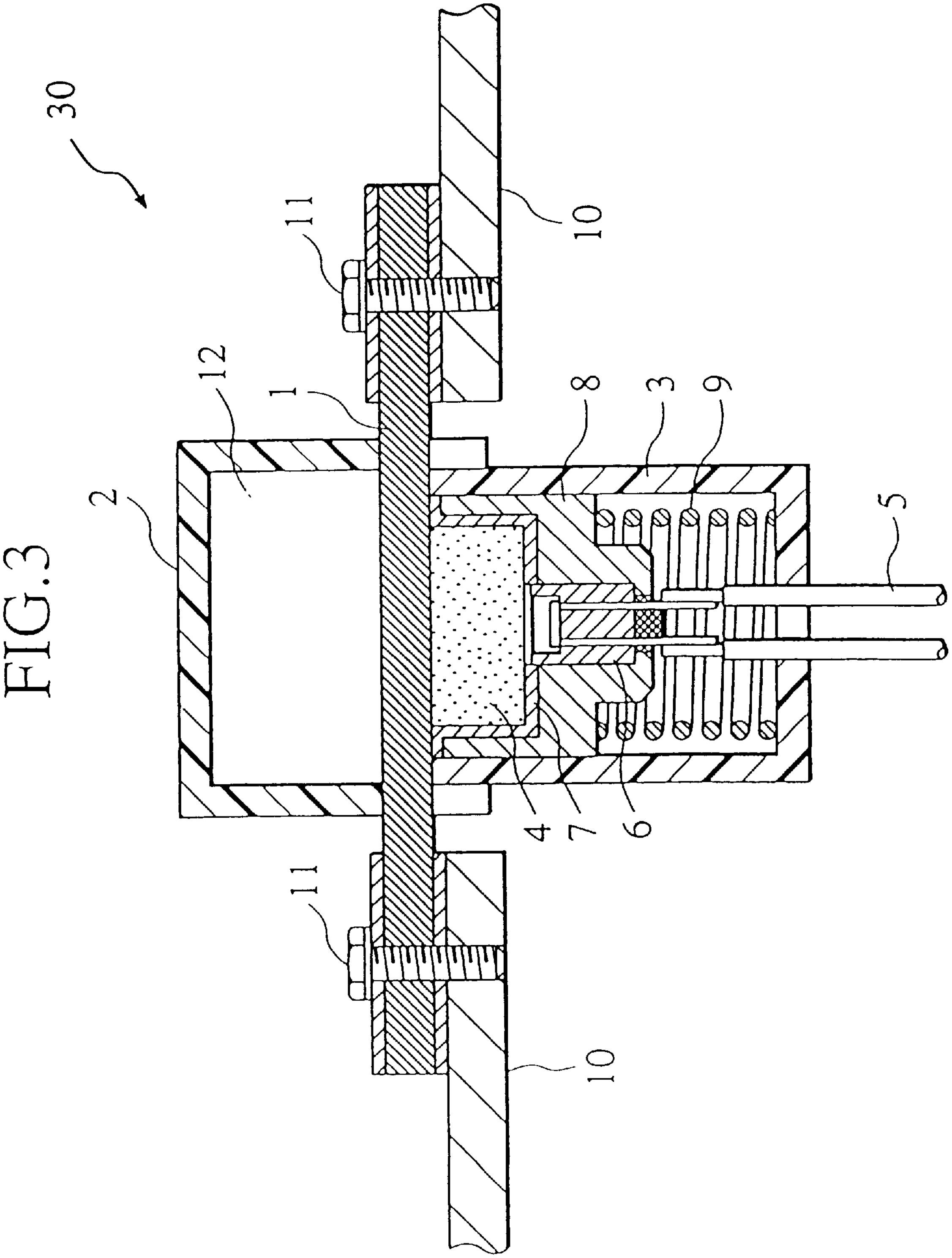
FIG. 3 is a front sectional view illustrating a circuit breaker including a fuse fusion apparatus according to an embodiment of the present invention.
Figure 4:
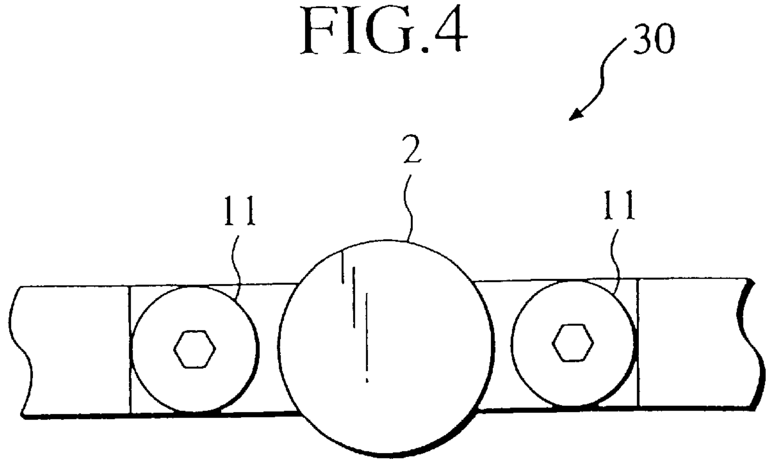
FIG. 4 is an upper surface view illustrating the circuit breaker including the fuse fusion apparatus according to the embodiment of the present invention.
Figure 5:
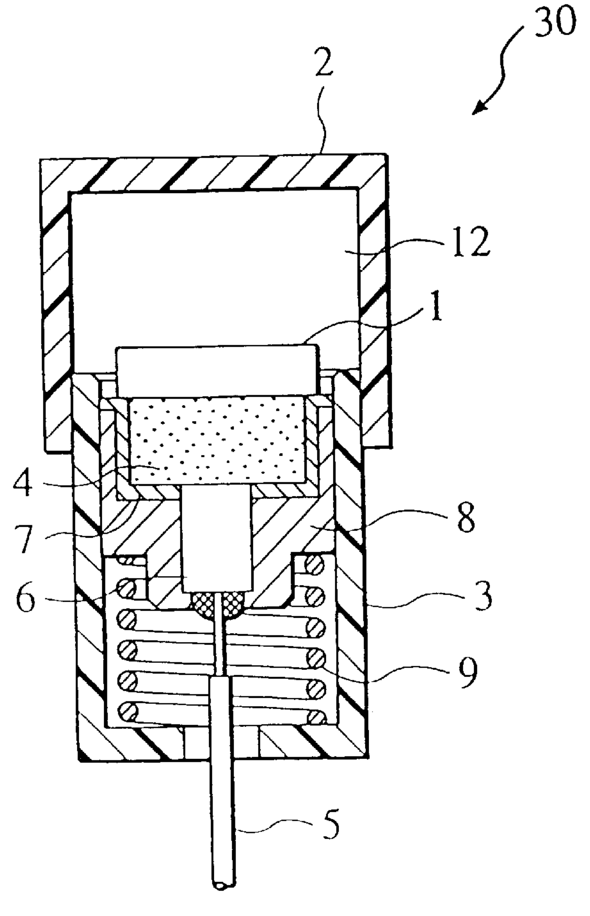
FIG. 5 is a side sectional view illustrating the circuit breaker including the fuse fusion apparatus according to the embodiment of the present invention.

FIG. 3 is a front sectional view of a circuit breaker including a fuse fusion apparatus 30 according to the embodiment. FIG. 4 is an upper surface view of the circuit breaker including the fuse fusion apparatus 30 according to the embodiment. FIG. 5 is a side sectional view of the circuit breaker including the fuse fusion apparatus 30 according to the embodiment.

The fuse fusion apparatus illustrated in FIG. 3 is constructed as follows. A fuse 1 is disposed between a cylindrical cap 2 having an opening and an outer casing 3 fitted into the cap 2.

A solid combustion agent 4 is disposed near the fuse 1 within the outer casing 3. On the outer side of the solid combustion agent 4 there is disposed a metal cup 7 in which the solid combustion agent 4 is disposed.

An igniting device 6 is disposed in the vicinity of the lower bottom center of the solid combustion agent 4 and metal cup 7 which is situated at a part of FIG. 3 under the same. Lead wires 5 are connected to the igniting device 6. When an abnormality happens in a vehicle as at the time of, for example, a collision accident thereof, the igniting device 6 receives a power supplied from the outside through the lead wires 5. The igniting device 6 which has received the power supplied therefrom generates heat by having a current passed therethrough, thereby causing a firing of the solid combustion agent 4.

The solid combustion agent 4, metal cup 7, and igniting device 6 are accommodated within an inner casing 8 and are adhered and fixed to the same. The solid combustion agent 4 and metal cup 7 are disposed in the vicinity of, or in contact with, the fuse 1.

Within the outer casing 3, there is disposed an extendable spring 9 as an urging member. The spring 9 is disposed between the inner casing and a bottom surface of the outer casing 3, whereby the inner casing 8 is caused to urge the fuse 1 by the elastic force of this spring 9.

The circuit breaker is constructed of the fuse fusion apparatus having the above-described construction, connection terminals 10, and bolts 11. On both ends of the fuse 1 there are respectively provided the bolts 11 and, by means of the bolts 11, the fuse 1 is fixed to the connection terminals 10. As a result, the connection terminals 10 are electrically connected to each other through the fuse 1 and bolts 11.

Figure 6:
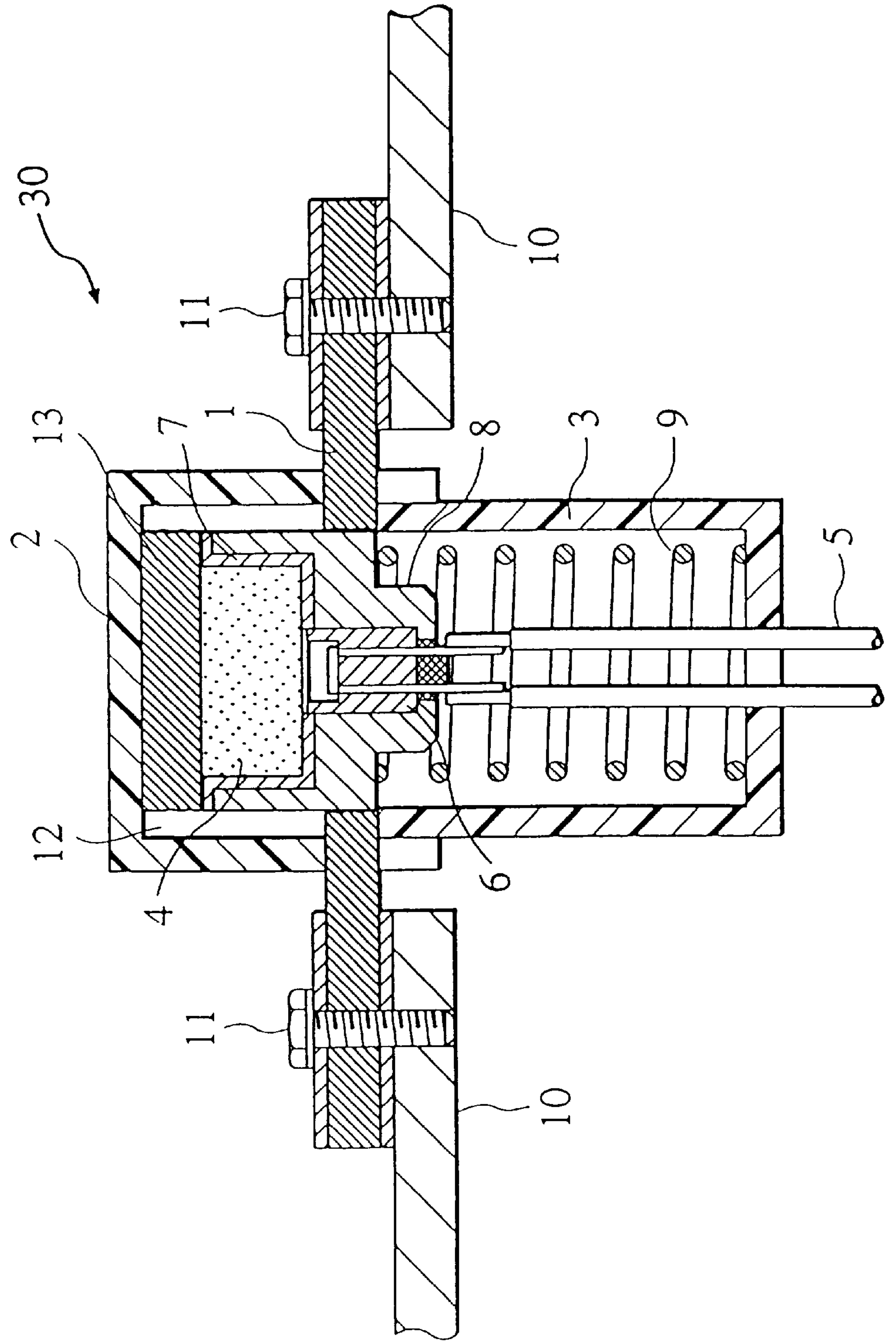
FIG. 6 is a front sectional view illustrating the fuse fusion apparatus according to the embodiment after the fuse was cut off by fusion.

Next, the operation of the fuse fusion apparatus will be explained with reference to the drawings. In FIG. 6 illustration is made of the fuse fusion apparatus 30 after the fusion of the fuse.

First, when the vehicle collides with an obstacle or the like, or the vehicle falls off from a cliff, a collision sensor not illustrated, etc. detects an abnormality, whereby, through the control of a control unit not illustrated, a current is caused to flow into the igniting device 6 through the lead wires 5.

The igniting device 6 which has had a current supplied thereto sparks, with the result that the solid combustion agent 4 is combusted and, by the resulting combustion heat, the surface of the metal cup 7 is heated to 700 to 1000° C. The combustion heat of the solid combustion agent 4 and the heat of the metal cup 7 causes a heating of the fuse 1, the fuse 1 as a result being softened.

And, as illustrated in FIG. 6, the portion of the fuse 1 corresponding to the interior of the inner casing 8 is pushed by the elastic force of the spring 9. Therefore, the fuse 1 is cut off and electrically broken within the inner casing 8. The cut piece 13 of the fuse 1 produced by the fuse 1 being pushed and cut is maintained in a state of its being accommodated within a cavity 12 of the cap 2 as illustrated in FIG. 6 and is kept away from re-contact with the original fuse 1.

Namely, when an abnormality happens in a vehicle as at the time of a collision, etc., the fuse 1 is quickly and reliably cut off by fusion. Also, by the fusion of the fuse 1, the connection terminals 10 on both ends of the fuse 1 have their electric connection interrupted, with the result that the electric circuit of the vehicle is broken.

Next, a detailed explanation will be given of concrete materials and their qualities of the respective constituent parts used in the above-described fuse fusion apparatus every item of the constituent parts.

Cap and Outer Casing

As the material constituting the cap 2 and outer casing 3, use is made of a ceramic coating of meal, gypsum, cement, and/or an insulating material such as resin. For this reason, even if after the cutoff of the fuse 1, the cap 2 and outer casing 3 contacts with the fuse 1, the both can be electrically insulated from each other.

In this case, since the solid combustion agent 4 generates a large amount of heat, ceramic, etc. is suitable as the material of the cap 2 and outer casing 3. However, considering the manufacturability, cost, etc., these members are optimumly made using a heat-resisting phenol resin. Also, the configuration of the cap 2 and outer casing 3 may be circular or square. However, considering the manufacturability and handleability, this configuration had better be circular.

Fuse

Since the fuse 1 is provided near the battery, a large magnitude of current flows. For this reason, as the fuse 1, not a commercially available pipe fuse, etc. to be cut off by fusion with an excess current but a fuse whose cross sectional area is considerably large had better be used.

A preferable example of the fuse 1 is one containing at least one kind of element selected from the group consisting of Sn, Pb, Zn, Al and Cu and having a melting point of from 200° C. to 300° C. inclusive.

A preferable example of the fuse 1 is a mixture which contains at least one kind of element selected from the group consisting of Fe, Sn, Pb, Zn, Al and Cu and resin, and which can be injection molded, and which has a softening point of from 200° C. to 300° C. inclusive. As the resin, nylon, AAS resin, ABS resin, etc. is used.

The resin may be a conductive resin consisting of a mixture of metal fiber, low melting point metal, flux, and synthetic resin. In this case, preferably, the metal fiber component is from 5 to 15 Vol % and the low melting point metal component is 20 to 40 Vol %.

As the metal fiber, there is cited by way of example copper fiber, brass fiber, aluminium fiber, stainless fiber, etc. Using such conductive resin, the moldability, solderability, and conductivity become particularly high in level.

It sometimes happens that a current having a magnitude of from 30 to 40 A is caused to flow instantaneously into the fuse 1. Therefore, in the case of a metal fuse, the cross-sectional area is needed to be 30 $mm^2$ or more and, in the case of a fuse consisting of a mixture of metal and resin, the cross-sectional area is needed to be 50 $mm^2$ or more.

Solid Combustion Agent

As the solid combustion agent 4 there are used metal powder containing therein at least one kind of element selected from the group consisting of B, Sn, FeSi, Zr, Ti, and Al, metal oxide containing therein at least one kind of element selected from the group consisting of CuO, $MnO_2$, $Pb_3O_4$, $PbO_2$, $Fe_3O_4$, and $Fe_2O_3$, and at least one kind of additive (combustion inhibitor) selected from the group consisting of alumina, bentonite, and talc.

When using this solid combustion agent 4, this agent is easily ignited by the flame from the igniting device 6. Since the combustion rate is high, it is possible to cut off the fuse 1 in a short period of time. Also, if using this solid combustion agent 4, a lesser amount of flame and gases is generated when the solid combustion agent 4 is combusted and therefore the shape of the agent 4 can be maintained as was before the combustion was made. Also, the amount of heat generated from the solid combustion agent 4 is sufficient as is if the unit amount thereof is 350 to 600 cal/g.

Metal Cup

The material quality of the metal cup 7 having the solid combustion agent 4 filled therein, preferably, is brass, copper, stainless steel, etc. which has a high heat conductivity and which is not dissolved by the heat generated from the solid combustion agent 4. The shape thereof may be circular or square. However, the size of a flange portion of the metal cup 7 is needed to be made larger than the width of the fuse 1 to be cut and, preferably, is the same as, or larger than, the contour size of the inner casing 8 consisting of an insulating material. This is because if the size of the flange portion is smaller than the contour size of the inner casing 8, the cut fuse 1 becomes likely to be caught by the inner casing 8.

Inner Casing

As illustrated in FIG. 6, the inner casing 8 is likely to contact with the cut fuse 1 and therefore it is preferable that the inner casing 8 has a quality of insulation. The same material as that constituting the cap 2 and outer casing 3 can be used as the material of the inner casing 8. Since the inner casing 8 is used only once, the function thereof can be sufficiently satisfied even if the inner casing 8 is made of phenol resin.

Spring

The greater the elastic force of the spring 9 is, the shorter the cutting period of time of the fuse 1 can be made. The spring 9 is caused to push for a long period of time until the fusion apparatus is operated and therefore the elastic force thereof has only to be set in connection with the strength of the fuse. The spring 9 has a stroke (elongation) sufficient to go on pushing the cut piece 13 of the fuse 1 up to the bottom portion of the cap 2 after the cutoff of the fuse.

Next, the results of the fusion tests performed using the fuse fusion apparatus illustrated in FIG. 3 will be explained as the following examples 1, 2 and 3.

First Example

The fuse 1 is a plate member formed of an alloy wherein the ratio of Pb to Sn is 40:60 and the thickness of which is 15 mm wide×5 mm thick (the fusing point is approximately 230° C.). The solid combustion agent 4 is a mixture of $Fe_2O_3$, Si, CuO, and Al. The unit amount of heat generated is approximately 420 cal/g.

Each of the outer casing 3, inner casing 8, and cap 2 is made of gypsum and square shaped. The spring constant of the spring 9 is 0.5 kg/mm.

When such setting was made, the fuse 1 was cut off by fusion in approximately 1.5 seconds after it was ignited.

Second Example

The fuse 1 is one obtained by mixing an alloy consisting of Sn and Pb (the ratio of Sn to Pb is 40:60) into an ABS resin in percentage of 80% and molding the resulting mixture into a plate of 20 mm wide×5 mm thick. The solid combustion agent 4 is a mixture of $Pb_3O_4$, FeSi, CuO, Al, and $Al_2O_3$. The unit amount of heat generated is approximately 400 cal/g.

Each of the outer casing 3, inner casing 8, and cap 2 is made of gypsum and square shaped. The spring constant of the spring 9 is 1.5 kg/mm.

When such setting was made, the fuse 1 was cut off by fusion in approximately 4 seconds after it was ignited.

Third Example

The fuse 1 is the same as in the case of the second example excepting that it is molded into a plate of 20 mm.wide×4 mm thick.

The solid combustion agent 4 is a mixture of $Pb_3O_4$, FeSi, CuO, and Al. The unit amount of heat generated is approximately 530 cal/g.

Each of the outer casing 3, inner casing 8, and cap 2 is made of bakelite and circularly shaped. The spring constant of the spring 9 is 1.5 kg/mm.

When such setting was made, the fuse 1 was cut off by fusion in approximately 2.6 seconds after it was ignited. It is to be noted that the surface temperature of the cut piece 13 (circular disk), outer casing 3, and cap 2 was 85° C. at maximum.

In this way, in the fusion apparatus of this embodiment, the fuse 1 is fixed by the outer casing 3 and cap 2 consisting of insulating material. The metal cup 7 filled with the solid combustion agent 4 and the igniting device 6 which takes fire by being supplied thereto with a current are disposed within the inner casing 8 consisting of insulating material. The inner casing 8 is pressed to the fuse 1 by the elastic force of the spring 9.

At the time of urgency, the igniting device 6 is caused to take fire by being supplied thereto with the current from the outside and as a result the solid combustion agent 4 is combusted without being shrunken. The fuse 1 is softened by the resulting combustion heat and this fuse 1 is cut off by the elastic force of the spring 9 with a size corresponding to the size of the metal cup 7.

Accordingly, at the time of a vehicle collision, etc., the fuse 1 installed in an electric circuit is cut off by fusion in a short period of time (in the first to third examples within a time period of 4 seconds). Namely, since the fuse 1 can be quickly and reliably cut off by fusion, it is possible to prevent a fire from being taken onto a gasoline, etc.

Also, the solid combustion agent 4 generates also a lesser amount of gases and flames. Therefore, it is possible to prevent flames or smokes from being leaked to the outside of the outer casing 3. Provided, however, that since part of the resinous fuse is melted due to the heat, the resulting smokes are discharged.

Further, since the apparatus uses only the combustion heat of the solid combustion agent 4, there is no need to provide a protection cover or the like that protects against the sounds, pressure rise, or broken pieces at the time of explosion which occurs due to the firing of the explosive or the like. This makes it possible to provide a fuse fusion apparatus having a simple structure.

Also, since the fuse 1, outer casing 3, etc. can be injection molded, it suits mass production. This makes it possible to produce the fuse fusion apparatus at a low cost.

Further, it is possible, whatever directionality the vehicle may have, to cut the fuse 1 off by fusion in whatever state the vehicle may be, and resultantly break the circuit.

Additionally, the present invention is not limited to the above-described embodiment and of course permits various modifications to be made and carried out without departing from the technical idea of the invention.

What is claimed is:

1. A fusion apparatus for use on a low melting point element, comprising:

a low melting point element installed in an electric circuit of a vehicle;

a solid combustion agent disposed near the low melting point element;

an igniting device which, when an abnormality happens in a vehicle, ignites the solid combustion agent;

an inner casing, the solid combustion agent being disposed within the inner casing, an urging member for urging the the inner casing toward the low melting point element;

wherein, after the solid combustion agent is ignited, the heat of the solid combustion agent heats the low melting point element, thereby softening the low melting point element; and wherein, a portion of the softened low melting point element that corresponds to the inner casing is cut by the inner casing being pushed by the force of the urging member.

2. A fusion apparatus according to claim 1, wherein the solid combustion agent is in contact with the low melting point element.

3. A fusion apparatus according to claim 1, wherein the igniting device takes fire upon receipt of a current supplied from the outside when an abnormality happens in a vehicle.

4. A fusion apparatus according to claim 1, further comprising an outer casing covering the solid combustion agent and the igniting device.

5. A fusion apparatus according to claim 4, wherein the outer casing has a quality of heat insulation and includes a surface insulated.

6. A fusion apparatus according to claim 4, wherein the urging member is disposed between the solid combustion agent and the outer casing.

7. A fusion apparatus according to claim 4, wherein the inner casing is slidably supported within the outer casing, wherein the solid combustion agent and the igniting device are fixed to the inner casing, and the urging member is disposed between the inner casing and the outer casing.

8. A fusion apparatus according to claim 7, wherein the urging member is constituted by a spring.

9. A fusion apparatus according to claim 1, wherein the solid combustion agent includes metal powder and metal oxide;

the metal powder contains therein at least one kind of element selected from the group consisting of B, Si, FeSi, Zr, Ti, and Al; and the metal oxide contains therein at least one kind of element selected from the group consisting of CuO, $MnO_2$, $Pb_3O_4$, $PbO_2$, $Fe_3O_4$, and $Fe_2O_3$.

10. A fusion apparatus according to claim 9, wherein the solid combustion agent contains an additive therein; and the additive contains therein at least one kind of element selected from the group consisting of alumina, bentonite, and talc.

11. A fusion apparatus according to claim 1, wherein the low melting point element consists of a fuse containing at least one kind of element selected from the group consisting of Sn, Pb, Zn, Al, and Cu; and the melting point of the fuse is from 200° C. to 300° C. inclusive.

12. A fusion apparatus according to claim 1, wherein the low melting point element consists of a fuse provided by injection molding a mixture of metal and resin;

the metal contains at least one kind of element selected from the group consisting of Fe, Sn, Pb, Zn, Al, and Cu; and the softening point of the fuse is from 200° C. to 300° C. inclusive.

13. A fusion apparatus according to claim 12, wherein the resin is a conductive resin containing metal fiber, low melting point metal, flux, and synthetic resin.

14. A circuit breaker for breaking an electrical circuit of a vehicle, comprising:

a fusion apparatus, comprising:

a low melting point element installed in an electric circuit of the vehicle;

a solid combustion agent disposed near the low melting point element;

an igniting device which, when an abnormality happens in a vehicle, ignites the solid combustion agent;

an inner casing, the solid combustion agent being disposed within the inner casing, and an urging member for urging the the inner casing toward the low melting point element;

conductive connection terminals disposed on both ends of the low melting point element; and connection members electrically connecting the connection terminals to the low melting point element and fixing these connection terminals;

wherein, after the solid combustion agent is ignited, the heat of the solid combustion agent heats the low melting point element, thereby softening the low melting point element;

wherein a portion of the softened low melting point element that corresponds to the inner casing is cut by the inner casing being pushed by the force of the urging member, thereby cutting the electrical connection between the connection terminals disposed on both ends of the low melting point element.

15. A method of breaking an electric circuit of vehicle comprising the steps of:

providing a low melting point element installed in an electric circuit of a vehicle;

providing an inner casing;

providing a solid combustion agent disposed within the inner casing, the solid combustion agent disposed near the low melting point element;

providing an igniting device which, when an abnormality happens in a vehicle, ignites the solid combustion agent;

urging the inner casing toward the low melting point element by an urging member;

wherein, after the solid combustion agent is ignited, the heat of the solid combustion agent heats the low melting point element, thereby softening the low melting point element; and wherein the urging member cuts a portion of the softened low melting point element that corresponds to the inner casing that is pushed by the force of the urging member.

* * * * *

UNITED STATES PATENT AND TRADEMARK OFFICE

CERTIFICATE OF CORRECTION

PATENT NO. : 6,194,988 B1
DATED : February 27, 2001
INVENTOR(S) : Noboru Yamaguchi et al.

It is certified that error appears in the above-identified patent and that said Letters Patent is hereby corrected as shown below:

Column 8, claim 1,
Line 46, "urging the the inner" should read -- urging the inner --.

Column 10, claim 14,
Line 10, "urging the the inner" should read -- urging the inner --.

Signed and Sealed this

Ninth Day of April, 2002

Attest:

JAMES E. ROGAN
*Director of the United States Patent and Trademark Office*

*Attesting Officer*